United States Patent
Keates et al.

(10) Patent No.: US 10,361,453 B2
(45) Date of Patent: Jul. 23, 2019

(54) BATTERY CELL STRUCTURE INCLUDING A SOLID-STATE ELECTROLYTE

(71) Applicant: Intel Corporation, Santa Clara, CA (US)

(72) Inventors: Andrew W. Keates, Los Gatos, CA (US); Naoki Matsumura, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 197 days.

(21) Appl. No.: 15/636,046

(22) Filed: Jun. 28, 2017

(65) Prior Publication Data

US 2019/0006706 A1   Jan. 3, 2019

(51) Int. Cl.
*H01M 10/0562* (2010.01)
*H01M 10/0525* (2010.01)
*H01M 10/24* (2006.01)
*H01M 2/04* (2006.01)

(52) U.S. Cl.
CPC ..... *H01M 10/0562* (2013.01); *H01M 2/0478* (2013.01); *H01M 10/0525* (2013.01); *H01M 10/24* (2013.01)

(58) Field of Classification Search
CPC ............ H01M 10/052; H01M 2/0478; H01M 10/0525; H01M 10/24
See application file for complete search history.

*Primary Examiner* — Helen Oi K Conley
(74) *Attorney, Agent, or Firm* — Alliance IP, LLC

(57) ABSTRACT

A battery cell structure, a system including the structure, and a method of fabricating the structure. The structure includes: a cell housing; a cathode in the cell housing, the cathode including a cathode material; a cathode current collector adjacent the cathode in the cell housing; an anode in the cell housing, the anode including an anode material; an anode current collector adjacent the anode in the cell housing; a separator in the cell housing between the cathode and the anode. The cathode material comprises a recycled material including a contaminant, and the battery cell structure further includes a solid-state electrolyte disposed in the cell housing to at least partially prevent the contaminant from growing.

25 Claims, 6 Drawing Sheets

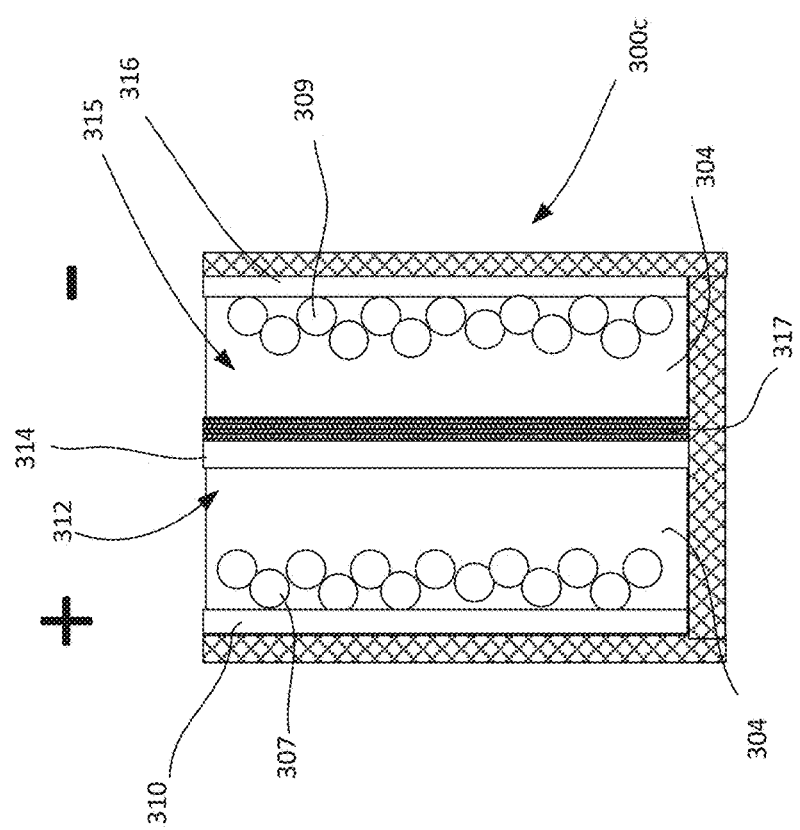

US 10,361,453 B2

BATTERY CELL STRUCTURE INCLUDING A SOLID-STATE ELECTROLYTE

TECHNICAL FIELD

Embodiments described herein generally relate to portable energy sources such as batteries, and more particularly to rechargeable batteries using recycled battery materials, such as lithium metal oxides.

BACKGROUND

The automotive industry is pushing demand for Lithium (Li) ion (Li-ion) batteries to levels where raw materials, for example Cobalt (Co), Li and/or Nickel (Ni), could fail to meet demand. Although the use of recycled battery materials, containing for example Co, Li or Ni, along with impurities/contaminants, has been explored in the past, there exist safety concerns in making new batteries using such materials, such safety concerns being associated with the relative impurity of recycled materials as compared with virgin materials. In addition, the cost of a battery is a large proportion of the cost of an electronic device, such as an electric vehicle or a laptop. Although increasing demand and production efficiency has reduced the cost of batteries, no effective alternative has been found for the Co/Li/Ni used in high-energy Li-ion batteries. Co is widely expected to present a supply problem, as it is a byproduct of Copper (Cu) and Nickel (Ni) mining, with only a small market share mined as Co. However, a reduction in demand for Cu and Ni has suppressed Co production, and using virgin Co is becoming a cost and supply risk issue.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 3c is a schematic illustration of a cross section of a rechargeable battery according to a third embodiment;

DETAILED DESCRIPTION

Figure 1:
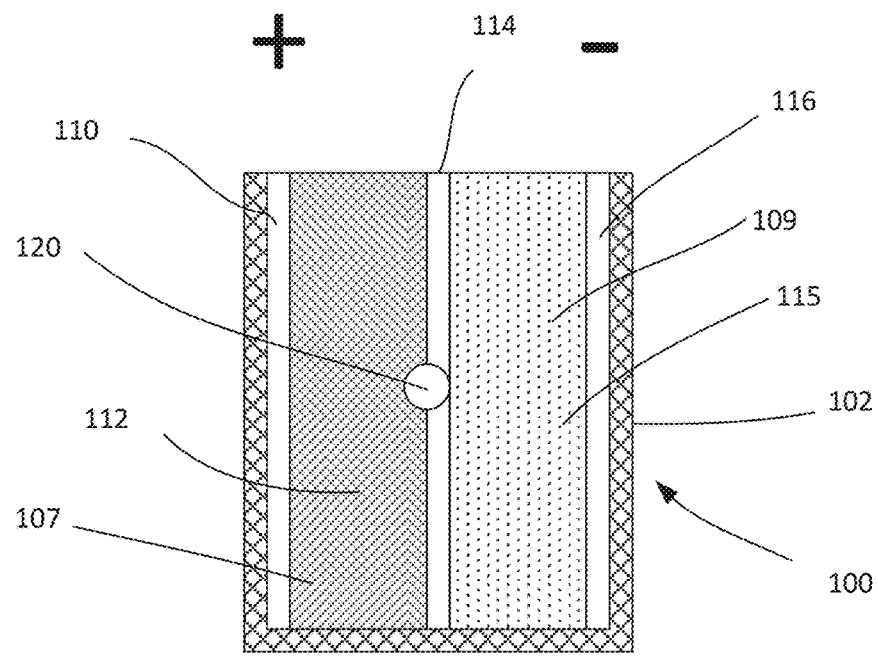
FIG. 1 is a schematic illustration of a cross section of a rechargeable battery according to the prior art, showing a grown contaminant therein.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of the disclosed embodiments. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of actions, the order of such actions as presented herein is not necessarily the only order in which such actions may be performed, and certain of the stated actions may possibly be omitted and/or certain other actions not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

The term "battery" as used herein is meant to refer to either a "cell" as a basic electrochemical unit containing electrode components (e.g. cathode, anode, separator, electrolyte), and a "battery pack" that includes a collection of cells including a housing, electrical interconnections, and optionally electronics to control and protect the cells from failure. In addition, "cathode" as used herein refers to the positive electrode during discharge, and "anode" as used herein refers to the negative electrode during discharge, it being understood that, for a rechargeable battery, the cathode will act as the negative electrode and the anode will act as the positive electrode during charging.

FIG. 1 illustrates a cross-section of a metal rechargeable battery cell 100 with a cell housing 102, and including a cathode current collector 110, a cathode 112, a separator 114, and an anode 115, and an anode current collector 116. In the illustrated example, the cathode current collector 110 may comprise an electrically conductive material such as aluminum (Al), and the anode current collector 115 may comprise a conductive material such as copper. The cathode 112 and anode 115 may include a cathode material 107 and an anode material 109 respectively. Each of the cathode material 107 and anode material 109 may include one or more active energy storage materials (what we call "battery material" or "energy active material" herein). The active energy storage materials may be bathed in a liquid electrolyte material. The cathode material 107 may include an energy active material such as Lithium Cobalt Oxide ($LiCoO_2$), Lithium Nickel Manganese Cobalt Oxide ($LiNi_xMn_yCo_zO_2$ or "NMC"), or Lithium Nickel Cobalt Aluminum Oxide ($LiNi_xCo_yAl_zO_2$ or "NCA") with NMC being used mainly for automotive applications. The anode material 109 may include a battery material or energy active material such as graphite, a Lithium metal, Lithium Titanate or other Lithium metal oxide, hard carbon, a Tin/Cobalt alloy, or a Silicon and Carbon combination. The electrolyte, which permits ionic movement may include Lithium salts, such as $LiPF_6$, $LiBF_4$ or $LiClO_4$ in an organic solvent, such as ethylene carbonate, dimethyl carbonate and diethyl carbonate. The liquid electrolyte serves as a conductive material for the movement of ions between the electrodes during charge and discharge.

In the shown example, the metal rechargeable battery cell 100 is a Li-ion battery cell. In other embodiments, however, a metal other than lithium may be used (e.g., magnesium or tin). In other embodiments, the battery cell may comprise one of a magnesium ion battery cell, a tin ion battery cell, an aluminum ion battery cell and a hydrogen ion battery cell. The separator 114 may comprise a microporous polymer separator or other material that allows lithium ions (but not electrons) to pass during charging and discharging of the metal rechargeable battery cell 100. Persons skilled in the art will recognize from the disclosure herein that other materials may be used for the cathode current collector 110, the cathode 112, the separator 114, the anode 115, and the anode current collector. 114. A combination of the cathode current collector and the cathode may be referred to as a cathode electrode, and a combination of the anode current collector and the anode may be referred to as an anode electrode. Where the material used for the cathode portion of a rechargeable battery, such as the battery of FIG. 1, includes recycled materials, there exist safety concerns arising from the risk of internal short circuits resulting mainly from impurity/contaminant growth.

Referring still to FIG. 1, with the use of recycled battery material for the cathode, a contaminant growth may occur. Recycled battery materials are able to be refined to a degree, but still contain contaminants. These contaminants may react with the liquid electrolyte in a traditional battery cell, such reactions typically being brought about by the fact that the liquid electrolyte may contain elements that may combine with the contaminant to induce reactions resulting in a growth of the same. The contaminants may for example dissolve into the electrolyte, and may be solidify on the anode side during charging of the battery cell 100. The contaminant may also, as shown in FIG. 1 by contaminant 120, pierce the battery separator 114 by growing through the porous membrane of the same. The contaminant 120 may further grow in this manner from the anode side. If the contaminant 120 grows through the separator 114, the rechargeable battery cell 100 may be short-circuited, and the charge-discharge function may be lost. In the worst-case scenario, the battery may catch on fire and/or explode, posing many safety concerns. It is not unlikely that such a phenomenon may occur. In addition, even if the piercing of the separator does not lead to a catastrophic failure, it may lead to cell self-discharge, a more benign cell failure.

By "recycled material," what is meant in the instant disclosure is either a cathode material or an anode material that has been recycled from a former battery, and/or that contains contaminants that are likely to react with a liquid electrolyte and grow on either the cathode side or on the anode side.

Figure 2:
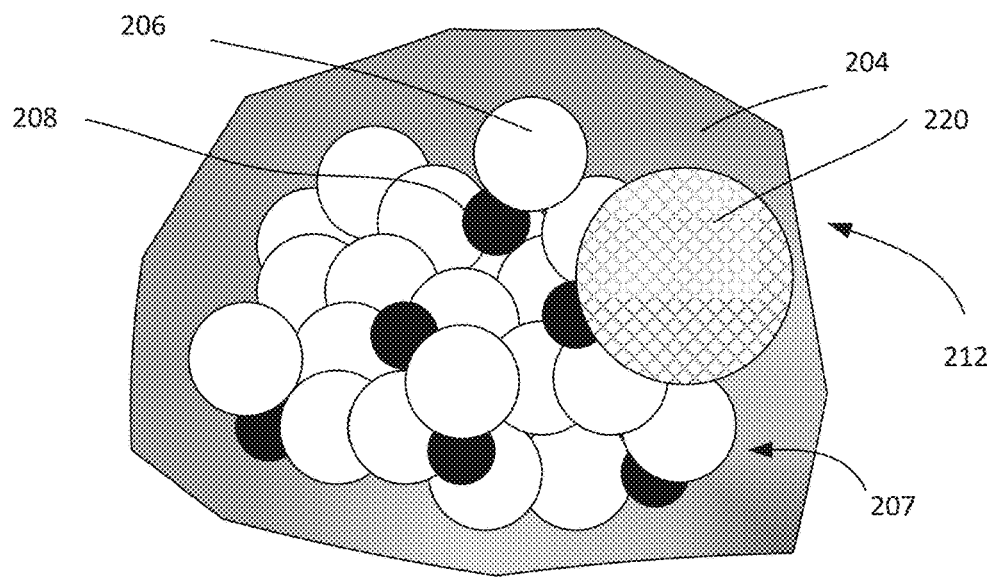
FIG. 2 is a schematic illustration of the lithium metal oxide compound mixed with copper as seen in FIG. 1, and containing a grown contaminant therein.

Referring next to FIG. 2, a schematic illustration is provided of a portion 212 of a cathode material 207, such as cathode material 107 of cathode 112 of FIG. 1, including an energy active material 206 such as any of the energy active materials for a cathode noted above, and further including a conductive element, such as conductive particles or material 208 mixed therein, for example carbon. The conductive particles are to transport electrons into and out of the particles of the metal oxide energy active material for the cathode, the electron transport to take place at the metallic current collectors, such as metallic current collector 110 of FIG. 1. The energy active material 206 and conductive particles or material 208 are shown as bathed in liquid electrolyte 204, such as any of the liquid electrolytes mentioned in the context of FIG. 1 above. The electrolyte, as previously noted, is to transport $Li^+$ ions to and from the metal oxide of the cathode energy active material 206, through the battery separator, such as separator 114 of FIG. 1 between the cathode and the anode. The liquid electrolyte may experience chemical reactions with other parts of the battery, which, over time, may contribute to reduced energy capacity in a battery. Such reactions are typically understood and controlled with a selection of the electrolyte materials and additives that tend to suppress expected side reactions. However, side reactions of the electrolyte with contaminants in energy active materials, such as contaminants in a recycled energy active material, or in a virgin, less refined energy active material are typically less predictable.

Referring still to FIG. 2, contaminants, such as contaminant 220, may physically shift due to mechanical expansion or contraction of other parts of the battery during charge and discharge, or may grow in size (as suggested in FIG. 2) as the liquid electrolyte flows to supply new elements to the contaminant for a side reaction. Such continued side reactions may cause the contaminant to grow, as suggested with respect to FIG. 1 for example, to a point where it creates a short circuit, and may not only cause a degradation in the electrolyte performance (since the side reactions sap reagents from the liquid electrolyte), but importantly may, by virtue of the short circuit, cause an explosion or fire caused by the battery.

Figure 3A:
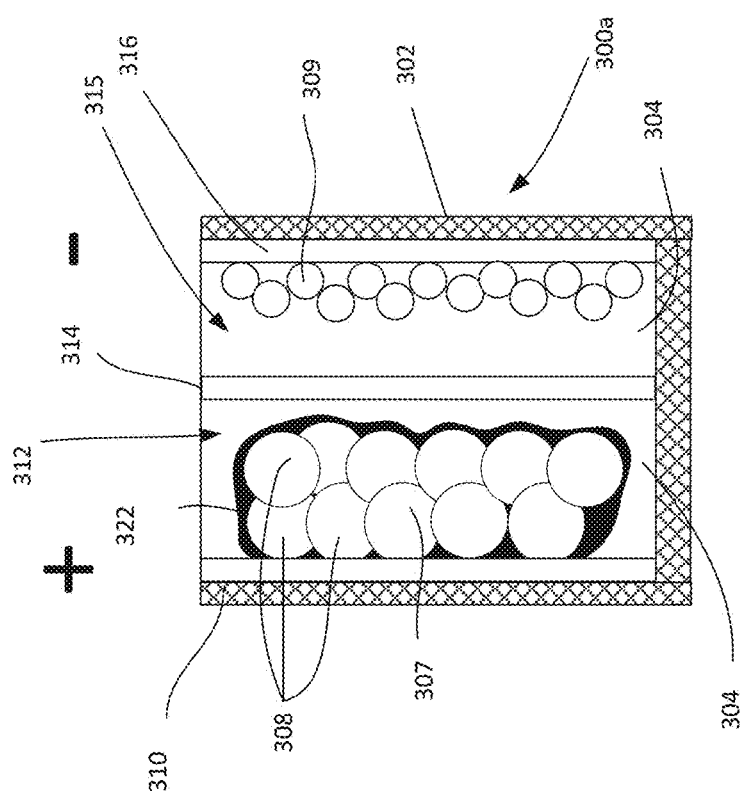
FIG. 3a is a schematic illustration of a cross section of a rechargeable battery according to a first embodiment.
Figure 3B:
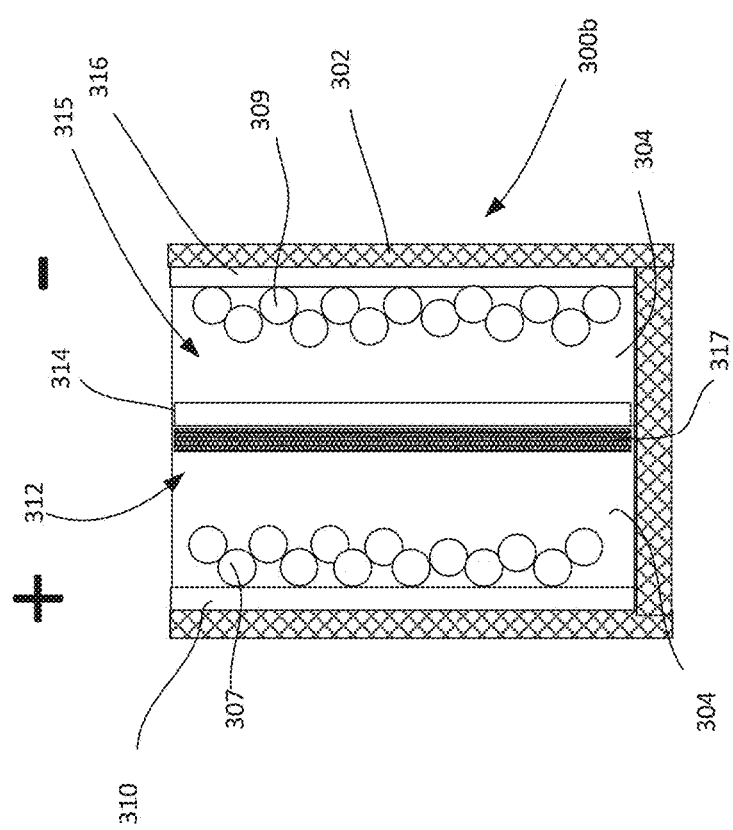
FIG. 3b is a schematic illustration of a cross section of a rechargeable battery according to a second embodiment.

Reference will now be made to FIGS. 3a-3c, which depict three different embodiments of a battery similar to FIG. 1, but with a solid-state (SS) electrolyte being used as will be explained for each of FIGS. 3a-3c below. Examples of a solid-state electrolyte material that may be used according to embodiments include a polymer material, such as Polyethylene Oxide (PEO), a ceramic material, such as Lithium Phosphate Oxynitride (LiPON), a sulfide material, such as Lithium Germanium Phosphorus Sulfur material (for example, $Li_{10}GeP_2S_{12}$)), as well as others as would be recognized by one skilled in the art. According to some embodiments, the solid-state electrolyte may for example include an ionic glass.

Referring to FIGS. 3a, 3b and 3c, respective cross-sections are shown of a metal rechargeable battery cell 300a, 300b and 300c similar to cell 100 of FIG. 1 except for the presence of a solid-state electrolyte as will be explained in more detail with respect to each of FIGS. 3a-3c below. The cells 300a, 300b and 300c each include a cell housing 302 and cathode current collector 310, a cathode 312, a separator 314, an anode 315, and an anode current collector 316. The cathode current collector 310, cathode material 307, anode material 309, separator 314 and liquid electrolyte 304 may include materials similar to the ones noted with respect to FIGS. 1 and 2 above. In addition, some embodiments also advantageously make possible the use of a material including lithium and sulfur material instead of a metal oxide for the cathode. Sulfur is less expensive, lighter and more abundant than metal oxide materials typically used in the cathode of a battery cell. However, whereas sulfur used as part of the cathode material may dissolve in a liquid electrolyte, the use of a solid-state electrolyte along with a cathode material that includes sulfur may serve to prevent such dissolution and may hence allow the more widespread use of a lithium sulfur recycled material for the cathode material.

As further shown in FIGS. 3a, 3b and 3c, the cathode material 307 and anode material 309 of the cathode 312 and anode 315 respectively may be located in a liquid electrolyte 304 as shown. However, embodiments are not limited to the use of a liquid electrolyte along with a solid-state electrolyte, and include within their scope the use of a solid-state electrolyte without the use of a liquid electrolyte.

Referring now in particular to FIG. 3a, according to one embodiment, the surface of the cathode material 307 may be provided with a solid-state electrolyte 322 coating or covering of cathode material 307 as shown. In the embodiment of FIG. 3a, the energy active cathode material portions 308 of the cathode material is 307 are shown as contacting each other and forming a cluster in order to allow electron flow throughout the cathode material and with the cathode collector 310. However, the cathode material is covered such that it does not directly contact the liquid electrolyte material to prevent contaminants with in the cathode material from growing, either on the cathode side or on the anode side of the battery cell. Alternatively, some embodiments may dispense with the liquid electrolyte material 304, and have only solid-state electrolyte present on the cathode side and possibly also on the anode side of the battery cell 300a. The cathode material may for example be coated or covered with any of the solid-state electrolyte materials noted above The embodiment of FIG. 3a is especially suited to cases where contaminants are atomic or molecular-sized in a cathode material. In such cases, contaminants, instead of growing as suggested in FIG. 2, may electrochemically dissolve into the liquid electrolyte, and be deposited on the anode material 309 before Li ions cross the separator. A dissolution of such contaminants may lead to the creation of dendrite on the anode side, which may lead to short-circuiting, overheating, fire or an explosion. Where only the surface of the cathode material 307 is covered with solid-state electrolyte, the solid-state electrolyte may selectively transport Li ions while containing the contaminants on the cathode side.

As shown in FIGS. 3b and 3c, the solid-state electrolyte may be provided on either the cathode side (FIG. 3b) or anode side (FIG. 3c) of the cell. The embodiments of FIGS. 3b and 3c provide a solid-state electrolyte in the form of a film or layer 317 in a region where stopping contaminant growth (through the provision of reagents) to any contaminants within energy active materials) may be especially important, that is, at the separator 314 between the cathode 312 and anode 315 where contaminant growth would otherwise create a short circuit as seen by way of example in FIG. 2. Placing a layer 317 of solid-state electrolyte at the separator, either on the cathode side (FIG. 3b) or on the anode side (FIG. 3c) may help to impede the reaction of the liquid electrolyte material with any contaminants in the cathode or anode material at the separator region, thus forming an impediment to the piercing of the separator by a growing contaminant, and in this way preventing a short-circuit such as the case shown in FIG. 1.

Thus, according to certain embodiments described herein, a solid-state electrolyte may be used in a cell in order to mitigate or overcome safety and reliability issues associated with the use of energy active materials having contaminants therein within a rechargeable battery. A solid-state (SS) electrolyte may be configured to isolate contaminants as it is in solid form, and, as such, it is not able to continue to supply a contaminant-side reaction by supplying reactive materials to the contaminant that may allow it to react and grow. The use of solid-state electrolytes may be advantageous not only with respect to recycled battery materials which typically contain contaminants, but also with respect to less refined but still virgin battery materials, thus providing a safer and more practical choice for the manufacture of new rechargeable batteries.

Advantageously, embodiments allow the continued use of recycled battery materials. Using such materials has its own advantages, including, for example: (1) reduced environmental hazard from discarded materials; (2) less pressure on the Democratic Republic of Condo to expand Co mines; (3) reduced costs of disposing of battery materials and procuring active materials for making new batteries; and (4) a mitigation of the impending shortage of raw/virgin battery materials, or mitigation of the energy capacity loss brought about by attempting to use materials inferior in their performance to Co.

Figure 4:
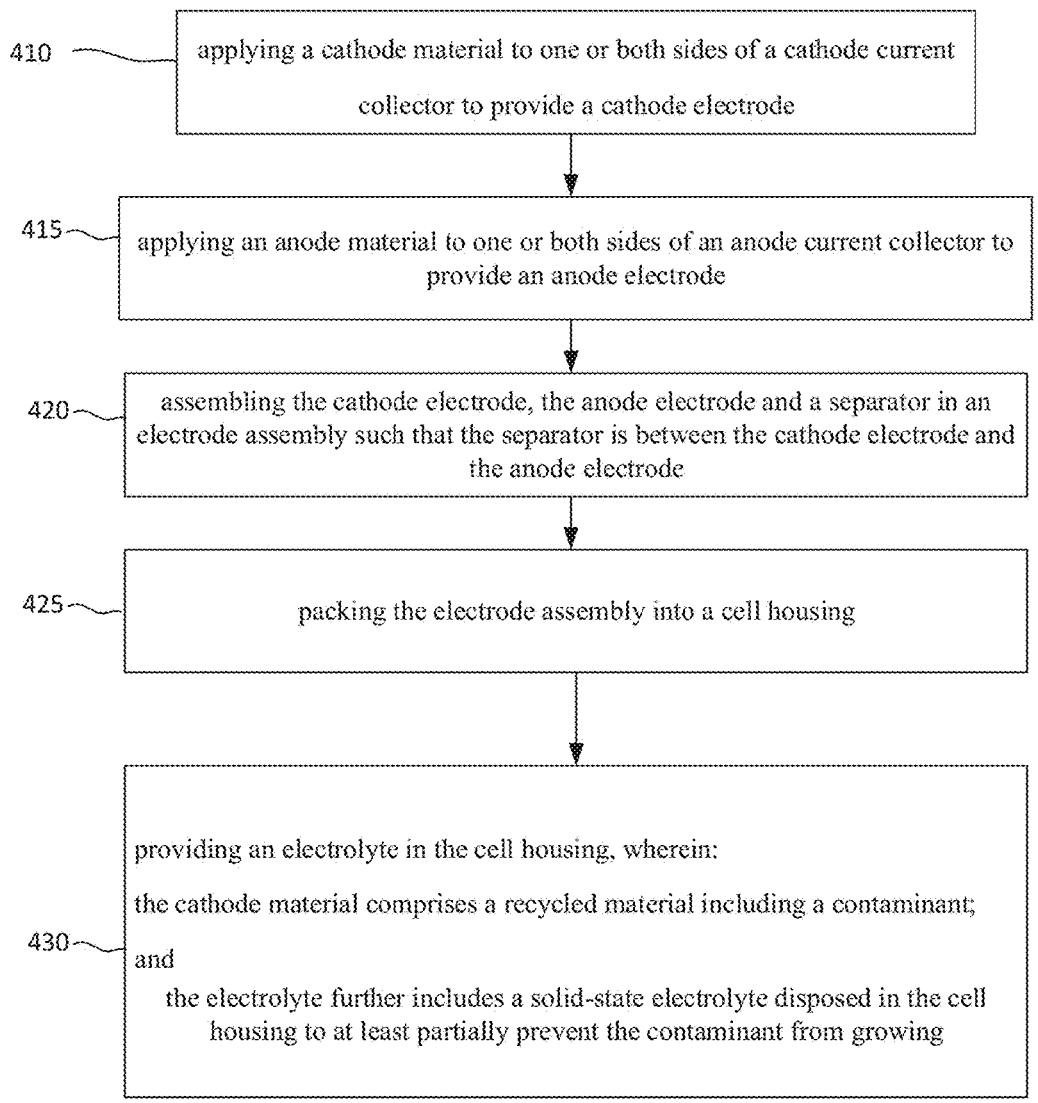
FIG. 4 is a schematic illustration of a method of making a battery according to an embodiment.

FIG. 4 is flow chart of a method 400 for manufacturing a metal rechargeable battery according to one embodiment. The method 400 comprises at 410 applying a cathode material to one or both sides of a cathode current collector to provide a cathode electrode; at 415 the method comprises applying an anode material to one or both sides of an anode current collector to provide an anode electrode; at 420, the method comprises assembling the cathode electrode, the anode electrode and a separator in an electrode assembly such that the separator is between the cathode electrode and the anode electrode; at 425, the method comprises packing the electrode assembly into a cell housing; and at 430, the method comprises providing an electrolyte in the cell housing, wherein: the cathode material comprises a recycled material including a contaminant; and the electrolyte further includes a solid-state electrolyte disposed in the cell housing to at least partially prevent the contaminant from growing.

In certain embodiments, providing the solid-state electrolyte material comprises selecting a material from a group consisting of a polymer material, such as Polyethylene Oxide (PEO), a ceramic material, such as Lithium Phosphate Oxynitride (LiPON), a sulfide material, such as Lithium Germanium Phosphorus Sulfur material (for example, Li10GeP2S12)), as well as others as would be recognized by one skilled in the art. According to some embodiments, the solid-state electrolyte may for example include an ionic glass.

Figure 5:
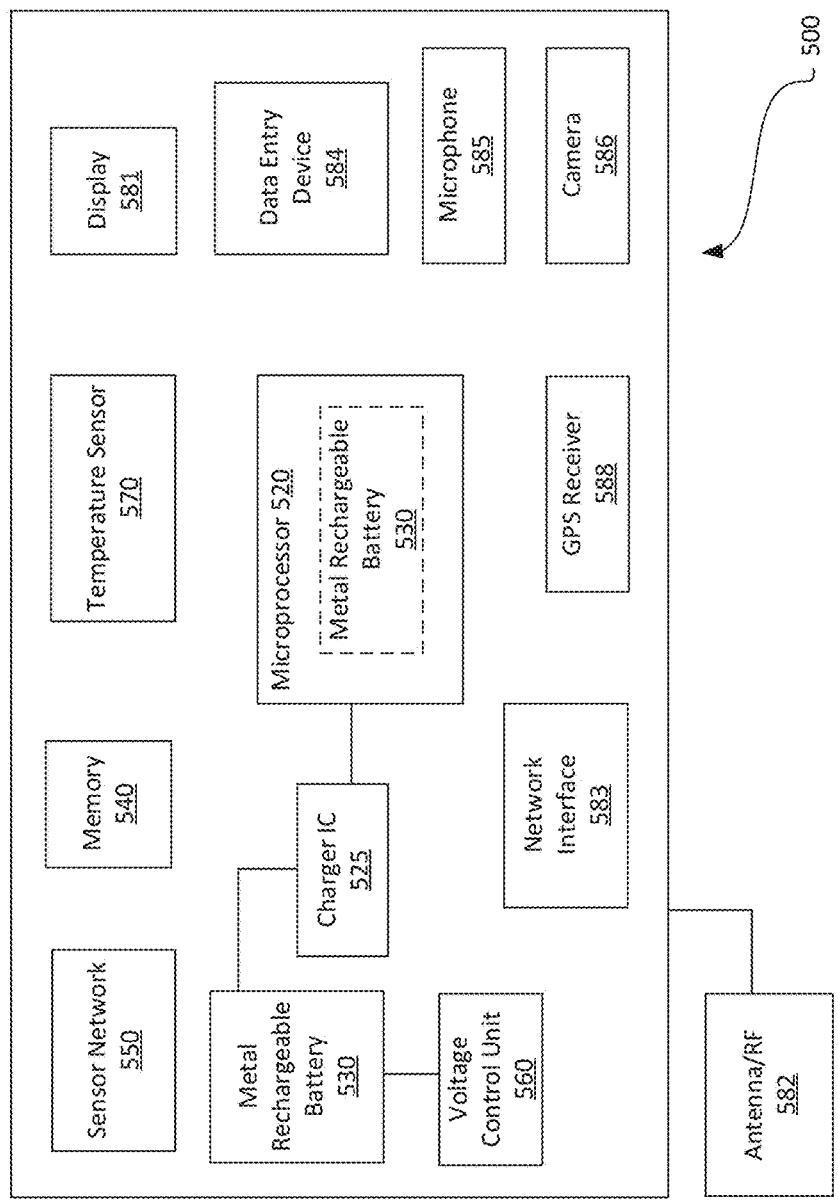
FIG. 5 is a schematic illustration of an electronic device including a battery according to an embodiment.

FIG. 5 illustrates a block diagram of an electronic device 500, such as one that may be used in an automotive application or in a mobile device, according to one embodiment. As illustrated in FIG. 5, the electronic device 500 includes a substrate 510 on which a microprocessor 520 and a metal rechargeable battery 530 associated with microprocessor 520 are disposed. The metal rechargeable battery 530 may either be located on a substrate 510 away from microprocessor 520, as illustrated in solid lines, or it may be located on the microprocessor 520 itself, as illustrated in dashed lines. In one embodiment, the metal rechargeable battery 530 may include a solid-state electrolyte material, and may comprise for example one of the battery cells shown in any one of FIGS. 3a-3b. In one embodiment, the electronic device 500 may include a charger integrated circuit (IC) 525 coupled between the metal rechargeable battery 530 and the microprocessor 520. The charger IC 525 is configured to cooperate with the microprocessor 520 to charge the metal rechargeable battery and to provide safety and notification features such as battery-in-place, charger present, end-of-charge, over voltage, and charge time-out. The charger IC 525 may be independently programmable to provide, for example, pre-charge, fast-charge and termination charging.

In at least some embodiments, the metal rechargeable batteries 530 is one of a plurality of metal rechargeable batteries (all of which are represented in FIG. 5 by block 530) contained within the electronic device 500. In some embodiments, the electronic device 500 further includes a sensor network 550 associated with metal rechargeable batteries 530. In at least some embodiments each one of the plurality of metal rechargeable batteries will have its own sensor that indicates certain behavioral parameters of the metal rechargeable battery. For example, the sensors may indicate existing voltage levels as well as the ongoing charge and discharge states. In those cases, it may be advantageous to include along with the sensor network a finite state machine such as a voltage control unit 560 that knows the behavior of the batteries and responds accordingly. A voltage control unit may be able to compensate for short circuits or other problems in any particular cells. A temperature sensor 570 associated with metal rechargeable batteries 530 may also be included in order to sense temperature (or other safety-related parameters). In certain embodiments, the electronic device 500 further includes one or more of: a memory 540, a display 581, antenna/radio frequency (RF) elements 582, a network interface 583, a data entry device 584 (e.g., a keypad or a touchscreen), a microphone 585, a camera 586, a global positioning system (GPS) receiver 588, and the like.

Functions, operations, components and/or features described herein with reference to one or more embodiments, may be combined with, or may be utilized in combination with, one or more other functions, operations, components and/or features described herein with reference to one or more other embodiments, or vice versa.

EXAMPLES

The following examples pertain to further embodiments.

Example 1 includes a battery cell structure comprising: a cell housing; a cathode in the cell housing, the cathode including a cathode material; a cathode current collector adjacent the cathode in the cell housing; an anode in the cell housing, the anode including an anode material; an anode current collector adjacent the anode in the cell housing; a separator in the cell housing between the cathode and the anode, wherein: the cathode material comprises a recycled material including a contaminant; and the battery cell structure further includes a solid-state electrolyte disposed in the cell housing to at least partially prevent the contaminant from growing.

Example 2 includes the subject matter of Example 1, and optionally, wherein the solid-state electrolyte forms a covering over the cathode material.

Example 3 includes the subject matter of Example 2, and optionally, wherein the battery cell structure further includes a liquid electrolyte on a cathode-side thereof, and wherein the solid-state electrolyte covers the cathode material to prevent direct contact between the cathode material and the cathode-side liquid electrolyte.

Example 4 includes the subject matter of Example 3, and optionally, wherein the cathode materials includes energy active cathode material portions forming a cluster, and wherein the solid-state electrolyte covers the cluster.

Example 5 includes the subject matter of Example 1, and optionally, wherein the solid-state electrolyte comprises a film at least partially covering the separator on a cathode-side thereof.

Example 6 includes the subject matter of Example 1, and optionally, wherein the solid-state electrolyte comprises a film at least partially covering the separator on an anode-side thereof.

Example 7 includes the subject matter of Example 1, and optionally, wherein the battery cell structure comprises one of a lithium-ion battery cell, a magnesium ion battery cell, a tin ion battery cell, an aluminum ion battery cell and a hydrogen ion battery cell.

Example 8 includes the subject matter of Example 1, and optionally, wherein the solid-state electrolyte comprises one of Polyethylene Oxide (PEO), Lithium Phosphate Oxynitride (LiPON), and a Lithium Germanium Phosphorus Sulfur material (Li10GeP2S12)).

Example 9 includes an electronic system comprising: a processor to perform an operation; a battery port to receive a battery cell structure; a display to display an image; and a charging device to charge a portion of the battery cell structure, the battery cell structure to include: a cell housing; a cathode in the cell housing, the cathode including a cathode material; a cathode current collector adjacent the cathode in the cell housing; an anode in the cell housing, the anode including an anode material; an anode current collector adjacent the anode in the cell housing; a separator in the cell housing between the cathode and the anode, wherein: the cathode material comprises a recycled material including a contaminant; and the battery cell structure further includes a solid-state electrolyte disposed in the cell housing to at least partially prevent the contaminant from growing.

Example 10 includes the subject matter of Example 9, and optionally, wherein the solid-state electrolyte forms a covering over the cathode material.

Example 11 includes the subject matter of Example 10, and optionally, wherein the battery cell structure further includes a liquid electrolyte on a cathode-side thereof, and wherein the solid-state electrolyte covers the cathode material to prevent direct contact between the cathode material and the cathode-side liquid electrolyte.

Example 12 includes the subject matter of Example 11, and optionally, wherein the cathode materials includes energy active cathode material portions forming a cluster, and wherein the solid-state electrolyte covers the cluster.

Example 13 includes the subject matter of Example 9, and optionally, wherein the solid-state electrolyte comprises a film at least partially covering the separator on a cathode-side thereof.

Example 14 includes the subject matter of Example 9, and optionally, wherein the solid-state electrolyte comprises a film at least partially covering the separator on an anode-side thereof.

Example 15 includes the subject matter of Example 9, and optionally, wherein the battery cell structure comprises one of a lithium-ion battery cell, a magnesium ion battery cell, a tin ion battery cell, an aluminum ion battery cell and a hydrogen ion battery cell.

Example 16 includes the subject matter of Example 9, and optionally, wherein the solid-state electrolyte comprises one of Polyethylene Oxide (PEO), Lithium Phosphate Oxynitride (LiPON), and a Lithium Germanium Phosphorus Sulfur material (Li10GeP2S12).

Example 17 includes a method of making a battery cell structure, the method comprising: applying a cathode material to one or both sides of a cathode current collector to provide a cathode electrode; applying an anode material to one or both sides of an anode current collector to provide an anode electrode; assembling the cathode electrode, the anode electrode and a separator in an electrode assembly such that the separator is between the cathode electrode and the anode electrode; packing the electrode assembly into a cell housing; providing an electrolyte in the cell housing, wherein: the cathode material comprises a recycled material including a contaminant; and the electrolyte further includes a solid-state electrolyte disposed in the cell housing to at least partially prevent the contaminant from growing.

Example 18 includes the subject matter of Example 17, and optionally, wherein providing the electrolyte includes heat treating a liquid electrolyte to turn the liquid electrolyte into the solid-state electrolyte.

Example 19 includes the subject matter of Example 18, and optionally, further including running a charge cycle through the battery cell structure to expel gas from the cell housing.

Example 20 includes the subject matter of Example 17, and optionally, wherein the solid-state electrolyte forms a covering over the cathode material.

Example 21 includes the subject matter of Example 20, and optionally, wherein the battery cell structure further includes a liquid electrolyte on a cathode-side thereof, and wherein the solid-state electrolyte covers the cathode material to prevent direct contact between the cathode material and the cathode-side liquid electrolyte.

Example 22 includes the subject matter of Example 21, and optionally, wherein the cathode materials includes energy active cathode material portions forming a cluster, and wherein the solid-state electrolyte covers the cluster.

Example 23 includes the subject matter of Example 17, and optionally, wherein the solid-state electrolyte comprises a film at least partially covering the separator on a cathode-side thereof.

Example 24 includes the subject matter of Example 17, and optionally, wherein the solid-state electrolyte comprises a film at least partially covering the separator on an anode-side thereof.

Example 25 includes the subject matter of Example 17, and optionally, wherein the battery cell structure comprises one of a lithium-ion battery cell, a magnesium ion battery cell, a tin ion battery cell, an aluminum ion battery cell and a hydrogen ion battery cell.

Example 26 includes the subject matter of Example 17, and optionally, wherein the solid-state electrolyte comprises one of Polyethylene Oxide (PEO), Lithium Phosphate Oxynitride (LiPON), and a Lithium Germanium Phosphorus Sulfur material (Li10GeP2S12).

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A battery cell structure comprising:
   a cell housing;
   a cathode in the cell housing, the cathode including a cathode material;
   a cathode current collector adjacent the cathode in the cell housing;
   an anode in the cell housing, the anode including an anode material;
   an anode current collector adjacent the anode in the cell housing;
   a separator in the cell housing between the cathode and the anode, wherein:
      the cathode material comprises a recycled material including a contaminant; and
      the battery cell structure further includes a solid-state electrolyte disposed in the cell housing to at least partially prevent the contaminant from growing.

2. The battery cell structure of claim 1, wherein the solid-state electrolyte forms a covering over the cathode material.

3. The battery cell structure of claim 2, wherein the battery cell structure further includes a liquid electrolyte on a cathode-side thereof, and wherein the solid-state electrolyte covers the cathode material to prevent direct contact between the cathode material and the cathode-side liquid electrolyte.

4. The battery cell structure of claim 3, wherein the cathode materials includes energy active cathode material portions forming a cluster, and wherein the solid-state electrolyte covers the cluster.

5. The battery cell structure of claim 1, wherein the solid-state electrolyte comprises a film at least partially covering the separator on a cathode-side thereof.

6. The battery cell structure of claim 1, wherein the solid-state electrolyte comprises a film at least partially covering the separator on an anode-side thereof.

7. The battery cell structure of claim 1, wherein the battery cell structure comprises one of a lithium-ion battery cell, a magnesium ion battery cell, a tin ion battery cell, an aluminum ion battery cell and a hydrogen ion battery cell.

8. The battery cell structure of claim 1, wherein the solid-state electrolyte comprises one of Polyethylene Oxide (PEO), Lithium Phosphate Oxynitride (LiPON), and a Lithium Germanium Phosphorus Sulfur material ($Li_{10}GeP_2S_{12}$)).

9. An electronic system comprising: a processor to perform an operation; a battery port to receive a battery cell structure; a display to display an image; and a charging device to charge a portion of the battery cell structure, the battery cell structure to include:
   a cell housing;
   a cathode in the cell housing, the cathode including a cathode material;
   a cathode current collector adjacent the cathode in the cell housing;
   an anode in the cell housing, the anode including an anode material;
   an anode current collector adjacent the anode in the cell housing;

a separator in the cell housing between the cathode and the anode, wherein:
   the cathode material comprises a recycled material including a contaminant; and
   the battery cell structure further includes a solid-state electrolyte disposed in the cell housing to at least partially prevent the contaminant from growing.

10. The system of claim 9, wherein the solid-state electrolyte forms a covering over the cathode material.

11. The system of claim 10, wherein the battery cell structure further includes a liquid electrolyte on a cathode-side thereof, and wherein the solid-state electrolyte covers the cathode material to prevent direct contact between the cathode material and the cathode-side liquid electrolyte.

12. The system of claim 11, wherein the cathode materials includes energy active cathode material portions forming a cluster, and wherein the solid-state electrolyte covers the cluster.

13. The system of claim 9, wherein the solid-state electrolyte comprises a film at least partially covering the separator on a cathode-side thereof.

14. The system of claim 9, wherein the solid-state electrolyte comprises a film at least partially covering the separator on an anode-side thereof.

15. The system of claim 9, wherein the battery cell structure comprises one of a lithium-ion battery cell, a magnesium ion battery cell, a tin ion battery cell, an aluminum ion battery cell and a hydrogen ion battery cell.

16. The system of claim 9, wherein the solid-state electrolyte comprises one of Polyethylene Oxide (PEO), Lithium Phosphate Oxynitride (LiPON), and a Lithium Germanium Phosphorus Sulfur material ($Li_{10}GeP_2S_{12}$).

17. A method of making a battery cell structure, the method comprising:
   applying a cathode material to one or both sides of a cathode current collector to provide a cathode electrode;
   applying an anode material to one or both sides of an anode current collector to provide an anode electrode;
   assembling the cathode electrode, the anode electrode and a separator in an electrode assembly such that the separator is between the cathode electrode and the anode electrode;
   packing the electrode assembly into a cell housing;
   providing an electrolyte in the cell housing, wherein:
      the cathode material comprises a recycled material including a contaminant; and
      the electrolyte further includes a solid-state electrolyte disposed in the cell housing to at least partially prevent the contaminant from growing.

18. The method of claim 17, wherein providing the electrolyte includes heat treating a liquid electrolyte to turn the liquid electrolyte into the solid-state electrolyte.

19. The method of claim 18, further including running a charge cycle through the battery cell structure to expel gas from the cell housing.

20. The method of claim 17, wherein the solid-state electrolyte forms a covering over the cathode material.

21. The method of claim 20, wherein the battery cell structure further includes a liquid electrolyte on a cathode-side thereof, and wherein the solid-state electrolyte covers the cathode material to prevent direct contact between the cathode material and the cathode-side liquid electrolyte.

22. The method of claim 21, wherein the cathode materials includes energy active cathode material portions forming a cluster, and wherein the solid-state electrolyte covers the cluster.

23. The method of claim 17, wherein the solid-state electrolyte comprises a film at least partially covering the separator on a cathode-side thereof.

24. The method of claim 17, wherein the solid-state electrolyte comprises a film at least partially covering the separator on an anode-side thereof.

25. The method of claim 17, wherein the solid-state electrolyte comprises one of Polyethylene Oxide (PEO), Lithium Phosphate Oxynitride (LiPON), and a Lithium Germanium Phosphorus Sulfur material ($Li_{10}GeP_2S_{12}$).

* * * * *